(12) United States Patent
Krauth et al.

(10) Patent No.: US 8,212,509 B2
(45) Date of Patent: Jul. 3, 2012

(54) POSITIONAL RECOGNITION USING BEMF ZERO CROSSOVER RECOGNITION OF A ROTOR OF AN ELECTRONICALLY COMMUTATED ELECTRIC MACHINE WITH TWO COIL SECTIONS OF DIFFERENT INDUCTANCES

(75) Inventors: Wolfgang Krauth, Achern-Sasbachried (DE); Johannes Rehagen, Karlsruhe (DE); Eike Hermann Timm, Brauschweig (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/737,996

(22) PCT Filed: Aug. 3, 2009

(86) PCT No.: PCT/EP2009/060008
§ 371 (c)(1),
(2), (4) Date: May 4, 2011

(87) PCT Pub. No.: WO2010/026008
PCT Pub. Date: Mar. 11, 2010

(65) Prior Publication Data
US 2011/0260665 A1    Oct. 27, 2011

(30) Foreign Application Priority Data
Sep. 8, 2008 (DE) .................... 10 2008 041 856

(51) Int. Cl.
*H02P 6/00* (2006.01)
(52) U.S. Cl. ........... 318/400.35; 318/400.32; 318/254.1; 318/432; 318/727; 310/74; 324/750.22; 116/286
(58) Field of Classification Search ............. 318/400.35, 318/400.32, 727, 254.1, 747; 310/74; 324/750.22, 324/754.11, 755.11; 116/286; 322/29
See application file for complete search history.

(56) References Cited

U.S. PATENT DOCUMENTS
2001/0002784 A1 * 6/2001 Masaki et al. ................ 318/727

FOREIGN PATENT DOCUMENTS
EP    0 802 613 A2 * 10/1997

* cited by examiner

*Primary Examiner* — Walter Benson
*Assistant Examiner* — Jorge Carrasquillo
(74) *Attorney, Agent, or Firm* — Ronald E. Greigg

(57) ABSTRACT

The invention relates to a method for positional recognition of a rotor of an electronically commutated electric machine, in particular an electric motor, in which a zero crossover of a voltage induced in a coil section of the rotor or stator is used for positional recognition. According to the invention, to determine the zero crossover the coil section is briefly powered down. A rotor/stator is used, comprising at least two coil sections, one of which has a lower inductance relative to the other one, and preferably only the coil section with the lower inductance is used for the positional recognition.

4 Claims, 3 Drawing Sheets

POSITIONAL RECOGNITION USING BEMF ZERO CROSSOVER RECOGNITION OF A ROTOR OF AN ELECTRONICALLY COMMUTATED ELECTRIC MACHINE WITH TWO COIL SECTIONS OF DIFFERENT INDUCTANCES

CROSS-REFERENCE TO RELATED APPLICATION

This application is a 35 USC 371 application of PCT/EP 2009/060008 filed on Aug. 3, 2009.

BACKGROUND OF THE INVENTION

1. Field of the Invention

The invention relates to a method for detecting the position of a rotor of an electronically commutated electric machine, in particular of an electric motor, in which a zero crossing of a voltage induced in a phase winding of the rotor or stator is used for position detection and in order to detect the zero crossing, the phase winding is briefly switched into a currentless state.

2. Description of the Prior Art

For an electronic commutation of an electric machine having a rotor and a stator, it is necessary to know the position of the rotor of the electric machine. This can be achieved by means of position detection. Position detections of the rotor can be carried out both with and without sensors. The electronically commutated electric machine typically has at least one phase winding, which is composed of at least one winding associated with the rotor or the stator. With the commutation, the winding constitutes an electromagnet that can be switched on and off. The part of the electric machine that does not have the phase winding, i.e. the stator or rotor, preferably has at least one permanent magnet that cooperates with the phase winding and produces a rotation of the rotor. The permanent magnet can also be replaced by an electromagnet. To detect the position of the rotor without a sensor, a zero crossing of an electric voltage, which the permanent magnet induces in the phase winding, is detected in the electric machine. To accomplish this, the induced voltage in the phase winding is measured. To be able to detect the zero crossing, the phase winding must be switched into a currentless state, i.e. it must not be supplied with current from the outside. This is because in the phase winding used for producing a force that drives the rotor, this production of force depends on an efficiency of the sum of all induced voltages and of the phase winding voltage. This means that in a hypothesized physically ideal phase winding, the current inside the phase winding flows in phase with the induced voltage. From this, it follows that the current in the phase winding is superimposed with the induced voltage so that a measurement of the zero crossing is not possible without taking corresponding steps. For this reason, the current in the phase winding is switched off before an expected zero crossing and is switched on again only after the zero crossing.

It is disadvantageous that the switching-off of the phase winding means that for the length of time that the switched-off phase winding remains switched off, no force production can occur and therefore no power can be generated. The electric machine consequently loses power density. Simply reducing the length of time during which the phase winding is switched to the currentless state so as to increase the power density of the electric machine results in an increased probability of an incorrect commutation. This is due to the fact that the subsequent switching-off of the phase winding is calculated based on the rotor speed and an expected speed change. As a result, when the length of time is reduced, only small speed changes can be taken into account since the zero crossing must lie within this time period. For this reason, in electric machines with a small speed change over time, not every zero crossing has to be measured; instead one or more zero crossings can be skipped. Considered over the operating time of the electric machine, this procedure yields a higher power density of the electric machine. But if high speed dynamics of the electric machine, i.e. significant and frequent speed changes, make it necessary to detect the zero crossing very often, then the power density can only be retained by minimizing the length of time during which the phase winding is switched off. For this reason, a method is required that permits the phase winding to be switched off as late as possible before an expected zero crossing and switched back on again quickly after the zero crossing.

SUMMARY OF THE INVENTION

According to the invention, a rotor/stator is provided, which has at least two phase windings, one of which has a lower inductance than the other and preferably, only the phase winding with the low inductance is used for position detection. The lower inductance results in the fact that the phase winding can be switched off more quickly and switched on more quickly than the phase winding with the higher inductance. Preferably, an electric machine is provided that associates the rotor/stator, which belongs to the phase winding, with a stator/rotor, which is equipped with at least one, preferably several, permanent magnets. The position detection then uses the voltage that the permanent magnets induce in the phase winding, thus permitting a commutation without sensors. Each of the phase windings has at least one winding that is wound around a winding core and consequently generates an electrical field that interacts with the permanent magnet. The permanent magnet can also be replaced by an electromagnet. When the rotor rotates, the permanent magnet induces the electrical voltage—an alternating electrical voltage—in the phase winding. If one of the windings is situated centrally within the magnetic field of the permanent magnet, then a zero crossing for the induced voltage occurs within the winding.

As provided in a modification of the invention, around the zero crossing, a measurement window is produced, which begins with the off-commutation of the switch to the currentless state and ends after the zero crossing of the induced voltage. The measurement window begins with the off-commutation of the switch to the currentless state. The term "off-commutation" describes the event that occurs during the period of time that is required from the beginning of the switching-off to the establishment of the currentless state within the phase winding. The measurement window corresponds to the length of time that the phase winding is completely without current. When the electric machine is being operated as a generator, this voltage can be directly detected and evaluated. When the electric machine is being operated as a motor, the induced voltage is superimposed with the electrical current supplied into the phase winding and cannot be detected. In order to nevertheless be able to carry out a measurement, the next expected zero crossing is determined and the current being supplied to the phase winding is switched off as late as possible before the expected zero crossing so that it is possible to detect the induced voltage in the phase winding, thus establishing the measurement window. In this connection, it is advantageous if the phase, winding is composed of a plurality of windings that are positioned to be angularly offset from one another. It is particularly advantageous if each of the windings is associated with a permanent magnet. These permanent magnets are preferably positioned to be angularly offset from one another in the same way. This results in the fact that a zero crossing is produced in all of the windings simultaneously and consequently, a zero crossing occurs in the entire phase winding. With a plurality of windings and/or permanent magnets, the position detection of the rotor indicates a relative position of the rotor, namely the position of one of the windings relative to one of the permanent magnets. A switching-off of one of the windings—the off-commutation—requires a certain switching-off time due to the inductive properties of the phase winding. The duration of the switching-off time is chiefly influenced by the inductance of the phase winding. Due to the reduction of the inductance of one of the phase windings, this phase winding can be switched on and off more quickly than the phase winding with the higher inductance. The quicker switching on and off makes it possible for the phase winding to be supplied with current for a longer time before being switched into the currentless state and more quickly builds up a force-producing and therefore power-generating magnetic field after being switched on, thus achieving a higher power density of the electric machine. This is the reason for the advantageous provision of using the phase winding with the lower inductance as the measurement winding. Because different inductances of the phase windings are used, these phase windings produce an asymmetrical magnetic circuit in the stator/rotor. This asymmetry can be largely compensated for by a suitable stator and/or rotor design. This leads to an improvement in the acoustics of the electric machine. It is also conceivable, through the use of the method according to the invention, to postpone the time at which the power is switched off, thus maintaining the power density, enlarging the measurement window, and increasing the sturdiness of the electronic commutation. Consequently, either the time at which the power is switched off is maintained, making the currentless measurement window longer due to the more quickly decaying current, or the current is switched off later and the current is therefore supplied for a longer time, thus maintaining the measurement window. It is also conceivable to provide a combination of the two possibilities so that an adaptive, dynamic system is dependent on the currently prevailing speed dynamics of the electric machine and the level of the current within the phase winding.

As provided in a modification of the invention, a rotor/stator with stator teeth is used, which teeth each have at least one tooth root and at least one tooth crest; one of the phase windings is situated around the tooth roots of the rotor/stator, another of the phase windings is situated around the tooth crests of the rotor/stator, and the phase winding situated around the tooth crests is used for the lower inductance. This arrangement makes it possible to have different inductances in the phase windings; the phase windings have the same flux linkage relative to the air gap. Flux linkage is understood to be a linkage of an excitation flux in the windings, for example by means of permanent magnets or excitation coils. As a result, with the same number of turns and the same phase winding current, the phase windings exert a virtually identical influence on the power density of the electric machine since comparable currents make comparable contributions to the overall torque of the electric machine. The stator teeth are preferably radially arranged so that viewed in the radial direction, the tooth crest is stacked onto the tooth root. In particular, this results in the fact that the phase winding that is associated with the tooth crests has the lower inductance.

BRIEF DESCRIPTION OF THE DRAWINGS

The invention will be explained in detail below in conjunction with the accompanying drawings, in which.

DESCRIPTION OF THE PREFERRED EMBODIMENT

Figure 1:
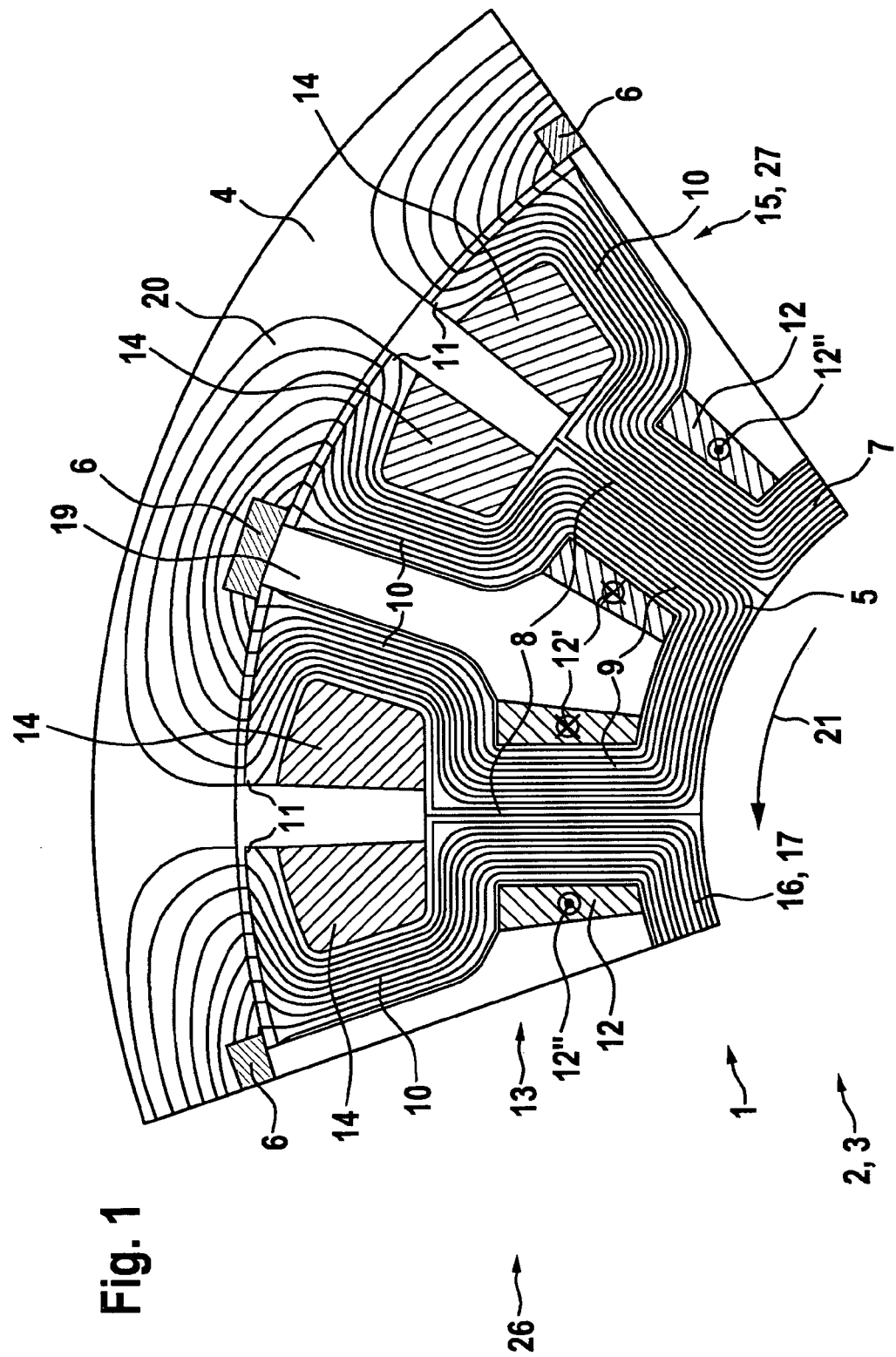
FIG. 1 shows a detail of an electric machine with a first supply of current.

FIG. 1 shows a detail 1 of a cross-sectionally depicted electric machine 2, which is embodied in the form of an electric motor 3. In the detail 1, regions of the stator 5 and a rotor 4 are depicted. The rotor 4 is an external rotor 4, which rotates around the stator 5 and encompasses it, and has a plurality of permanent magnets 6, which are uniformly distributed along the circumference direction of the rotor 4. Both the rotor 4 and the permanent magnets 6 are depicted only in schematic form in order to illustrate a function of the electric machine 2. The stator 5 is composed of a circular base element 7 on which stator teeth 8 are situated. The stator teeth 8 extend radially out from the base element 7 and each have a tooth root 9 that is attached to the base element 7. Each tooth root 9 has two tooth crests 10 that extend in a bowed shape viewed in cross section so that the bow ends 11 of two tooth crests 10 of a tooth root 9 are oriented toward each other. A tooth root winding 12 is situated around each tooth root 9. The tooth root windings 12 are combined to form a first phase winding 13. When the first phase winding 13 is supplied with current, this produces the current flow directions shown in FIG. 1 for the first phase winding 13. A circle 12' marked with an X indicates a current flow direction down into the plane of the paper and a circle 12" with a concentric dot indicates a current flow direction up out of the plane of the paper. For the current flow directions according to the depiction, this therefore yields winding regions with the same current flow direction situated adjacent to each other in the circumference direction between two tooth roots 9. Pairs of tooth crests 10 are associated with tooth crest windings 14. The tooth crests 10 encompassed by one tooth crest winding 14 each belong to a different stator tooth 8. For this reason, FIG. 1 shows only one complete tooth crest winding 14, while only half of two other tooth crest windings 14 are depicted. The tooth crest windings 14 are connected to one another to form a second phase winding 15. The second phase winding 15 shown in the drawing is in the currentless state. Inside the stator 5, a magnetic flux 16 that is flowing due to the supply of current to the tooth root windings 12 is depicted in the form of magnetic flux lines 17. The magnetic flux 16 is produced by two tooth root windings 12 via two tooth crests 10 of two different stator teeth 8. The two tooth crests 10 are spaded apart from each other so that an air gap 19 is formed between the tooth crests 10. The tooth crests 10 thus generate a magnetic field 20 that flows from one of the tooth crests 10 to the other tooth crest 10. In the figure, the rotor 4 is situated in a rotary position in which the permanent magnet 6 is situated in the middle of the magnetic field 20 and is moving in a rotation direction indicated by an arrow 21. The detail 1 consequently depicts a field distribution of the stator 5 when the first powered phase winding 13 is situated in free space. It is also necessary to take into account the fact that the magnetic fields 20 have alternating, different polarities in the circumference direction. In the drawing, both components, the rotor 4 and permanent magnets 6, have no influence on the magnetic fields 20 and magnetic flux 16 in order to permit illustration of the magnetic behavior of the stator 5.

Figure 2:
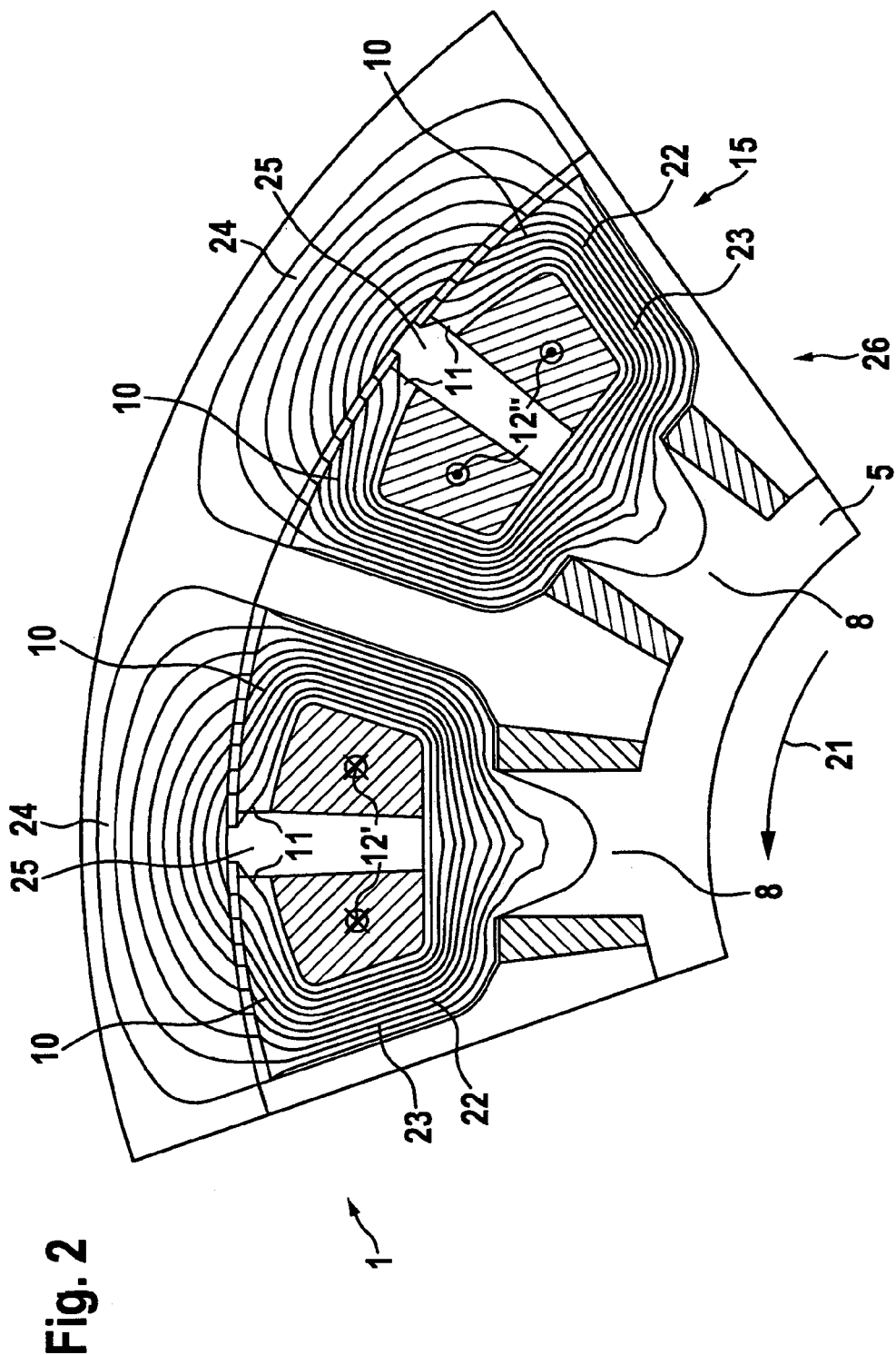
FIG. 2 shows the detail of the electric machine with a second supply of current.

FIG. 2 shows the detail 1 from FIG. 1 with the same features. By contrast with FIG. 1, in FIG. 2, the second phase winding 15 is supplied with current, which is depicted by means of the circles 12' and 12" with the same meanings as in FIG. 1. The first phase winding 13 here has been switched into the currentless state. The supply of current to the second phase winding 15 produces a second magnetic flux 22 in each of the stator teeth 8. The second magnetic flux 22 is depicted by means of magnetic field lines 23 and flows through two tooth crests 10 of a single stator tooth 8. The second magnetic flux 22 produces magnetic fields 24 that flow from one of the tooth crests 10 to the other of the tooth crests 10 in one stator tooth 8; these magnetic fields each bridge an air gap 25 between two bow ends 11 of the tooth crests 10. This current-supply state of the stator 5 produces a position of the magnetic fields 24 that is offset by one slot pitch in the space surrounding the stator 5 as compared to the position shown in FIG. 1. The magnetic fields 20 and 24 differ in position, but because of the equal flux linkage of the phase windings 13 and 15, do not differ or hardly differ in their magnetic characteristics with an equal phase winding current. It is also necessary to take into account the fact that the magnetic fields 24 have alternating, different polarities in the circumference direction.

FIGS. 1 and 2 permit a comparison of field characteristics of the magnetic fields 20 and 24 of the two phase windings 13 and 15 with different inductances in the phase windings 13 and 15.

The electric motor 3 is electronically commutated; the two phase windings 13 and 15 are simultaneously supplied with current that is electrically shifted by 90°. This produces a rotating field that travels in the circumference direction around the stator 5. Due to the embodiment of the first phase winding 13, it is provided with a higher inductance than the second phase winding 15. As a result of this embodiment, the two phase windings 13 and 15 produce an asymmetrical magnetic circuit 26 that has virtually the same flux linkage in both phase windings 13 and 15. Because of this embodiment, comparable currents in the phase windings 13 and 15 also constitute comparable portions of an overall torque of the electric machine 2. Because of the lower inductance of the second phase winding 15, it is used as the measurement winding 27.

Figure 3:
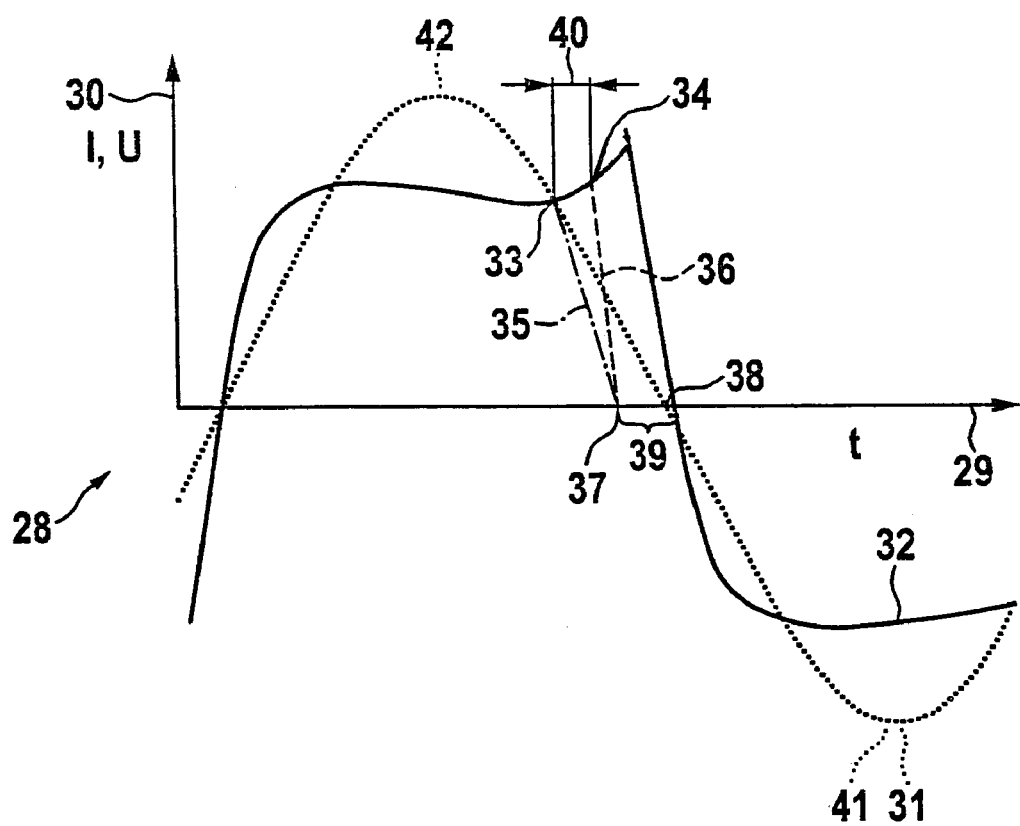
FIG. 3 is a current/voltage time diagram.

FIG. 3 shows a Cartesian coordinate system 28 with an abscissa 29 and an ordinate 30. The abscissa 29 is associated with time t and the ordinate 30 is associated with the rotor current I and the induced voltage U of the measurement winding 27. Within the Cartesian coordinate system 28, the induced voltage U is depicted as a dotted, sine-shaped voltage curve 31. A current curve 32 is likewise depicted with a solid line and represents a supply of current to the stator 5 without the use of position detection. Along the current curve 32, a first switch-off time 33 and a second switch-off time 34 are depicted. From the switch-off time 33, a dot-and-dash line current switch-off line 35 extends like a ramp to the abscissa 29 and from there, along the abscissa 29 to the current curve 32. From the switch-off time 34, a dashed current switch-off line 36 extends to the abscissa 29. It extends along the abscissa 29 to the current curve 32 in the same way as the current switch-off line 35. The two current switch-off lines 35 and 36 meet at the same currentless point 37 on the abscissa 29. A measurement window 39 extends from the currentless point 37 until after a zero crossing 38 of the induced voltage. The switch-off times 33 and 34 correspond to the times at the beginning of an off-commutation so that the measurement winding 27 is switched into the currentless state in the measurement window 39. The measurement window 39 opens every 180° of the electric phase of the induced voltage U. Two arrows indicate a length of time 40 between the switch-off times 33 and 34.

In a generator operation, the induced voltage U is produced, whose curve is depicted in the form of a voltage curve 31. The rotor 4 is in the position depicted in FIG. 1 upon occurrence of the zero crossing 38. The current curve 32 occurs in the measurement winding 27 when the machine is being operated purely as a motor. In order to be able to carry out the position detection, the measurement window 39 is established by switching the second phase winding 15, the measurement winding 27, into the currentless state. The current switch-off line 35 corresponds to an imaginary switch-off line 35 that would occur if the two phase windings 13 and 15 of the stator 5 had the same inductance and would therefore produce a symmetrical magnetic circuit and in this application, serves as a possible comparison for the method according to the invention. By contrast with the switch-off line 35, the switch-off line 36 has a steeper slope so that the switch-off time 34 can be shifted later along the abscissa 29 as compared to the switch-off time 33. This yields the time difference 40. The use of the second phase winding 15 with the lower inductance permits implementation of the current switch-off line 36. Since the two current switch-off lines 35 and 36 meet at the currentless point 37, they both produce the same measurement window 39, from which it follows that the later switch-off time 34 enabled by the invention results in a longer supply of current to the second phase winding 15. There is thus an increase in the power density of the electric machine 2, said increase being represented by the area between the current switch-off line 35, the current switch-off line 36, and the current curve 32. In addition to this power density gain when switching off, i.e. the off-commutation of the second phase winding 15, there is also a corresponding power gain when switching on the second phase winding 15. Due to the lower inductance, the second phase winding 15 produces a force-generating magnetic field 24 faster than another phase winding with a higher inductance. The current switch-on lines and the resulting power gain are not depicted in the figure.

In another embodiment, it is conceivable to maintain the electric power supplied to the phase winding 15 so that in the method according to the invention, the currentless point 37 is shifted earlier along the abscissa 29. This is not depicted in FIG. 3. This results in an enlargement of the measurement window 39, thus resulting in more robust position detection. The increasing robustness of the measurement prevents an incorrect commutation since the position detection delivers high-precision results.

With the geometry of the stator 5 shown in FIG. 1, if the first phase winding 13 is supplied with current, then this produces almost exactly the same effect in the air gap 19 as when the second phase winding 15 is supplied with an equal amperage. This reflects the equal flux linkage despite the asymmetrical plate geometry and slightly different numbers of turns. Since the first phase winding 13 causes magnetic flux 16 to flow through more material of the stator 5, e.g. steel, in the stator teeth 8 than the second phase winding 15, this yields the greater inductance of the first phase winding 13. The two magnetic fluxes 16 and 22—the magnetic flux paths—along the magnetic flux lines 17 and 23 have equal flux-collecting areas in the air gaps 19 and 25, yielding a comparable flux linkage of the two phase windings 13 and 15, resulting in the fact that the two phase windings 13 and 15 produce virtually the same induced voltage U. It follows from this that comparable currents in the phase windings 13 and 15 also make comparable contributions to the overall torque of the electric machine 2. The asymmetrical magnetic circuit 26 with a virtually equal flux linkage in the two phase windings 13 and 15 executes a commutation without sensors by using the second phase winding 15 with the lower inductance as the measurement winding 27. The lower inductance of the measurement winding 27 permits the inducing action of these currents to continue regardless of the measurement window 39, thus achieving a compensated behavior of the electric machine 2. Unevenly distributed electric loads in the two phase windings 13 and 15 would have a negative impact on the acoustics of the electric machine 2. The method according to the invention is therefore more economical than embodying all of the phase windings of an electric machine 2 with a low inductance. Furthermore, this would not compensate for an asymmetry in the triggering concepts between the measurement winding 27 and other phase windings, without disadvantageously influencing a utilization of the electric machine 2.

It is also conceivable to combine the above-described method with a pre-commutation. In this case, the induced voltage U is compared to a constantly shifting reference voltage, as a result of which, the measurement window 39 is once again situated on the abscissa in the Cartesian coordinate system 28. With a shift in a positive direction of the ordinate 30, i.e. in the arrow direction of the ordinate 30, the zero crossing 38 is shifted back along the abscissa 29, thus enabling an even later occurrence of the switching-off.

The foregoing relates to the preferred exemplary embodiment of the invention, it being understood that other variants and embodiments thereof are possible within the spirit and scope of the invention, the latter being defined by the appended claims.

The invention claimed is:

1. A method for position detection of a rotor of an electronically commutated electric machine, in particular an electric motor, comprising the steps of:
    using a zero crossing of a voltage induced in a phase winding of the rotor or stator for the position detection and in order to determine the zero crossing;
    briefly switching the phase winding into a currentless state;
    providing a rotor/stator, with at least two phase windings, one of which has a lower inductance than the other; and
    carrying out the position detection using only the phase winding with the lower inductance.

2. The method as recited in claim 1, further comprising the step of establishing a measurement window around the zero crossing, which measurement window begins with an off-commutation of the switching to the currentless state and ends after the zero crossing of the voltage induced.

3. The method as recited in claim 1, further comprising the steps of:
    using a rotor/stator with stator teeth, which teeth each have at least one tooth root and at least one tooth crest;
    situating one of the phase windings around the tooth roots of the rotor/stator, and situating another of the phase windings around the tooth crests of the rotor/stator; and
    using the phase winding situated around the tooth crests for the lower inductance.

4. The method as recited in claim 2, further comprising the steps of:
    using a rotor/stator with stator teeth, which teeth each have at least one tooth root and at least one tooth crest;
    situating one of the phase windings around the tooth roots of the rotor/stator, and situating another of the phase windings around the tooth crests of the rotor/stator; and
    using the phase winding situated around the tooth crests for the lower inductance.

* * * * *